UNITED STATES PATENT OFFICE.

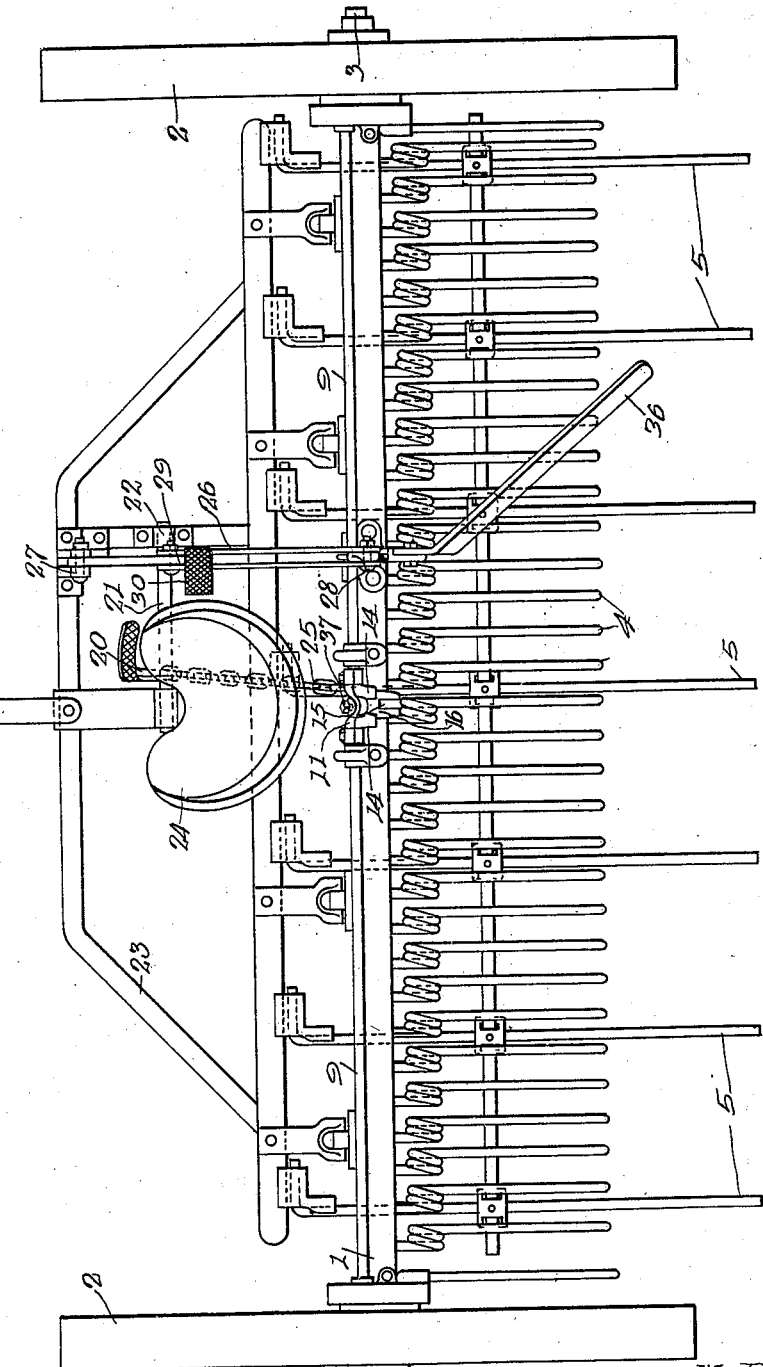

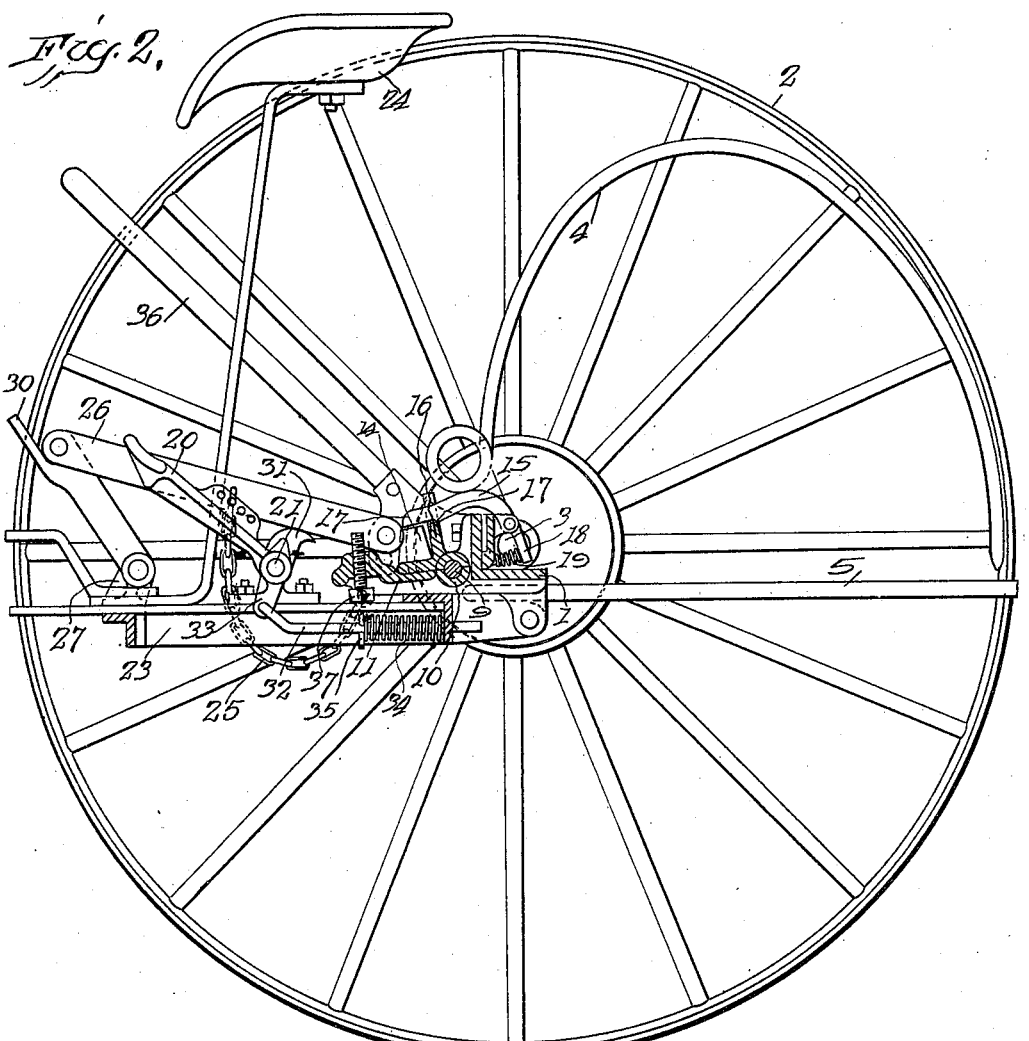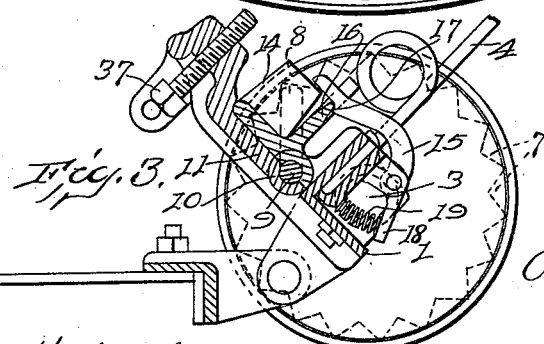

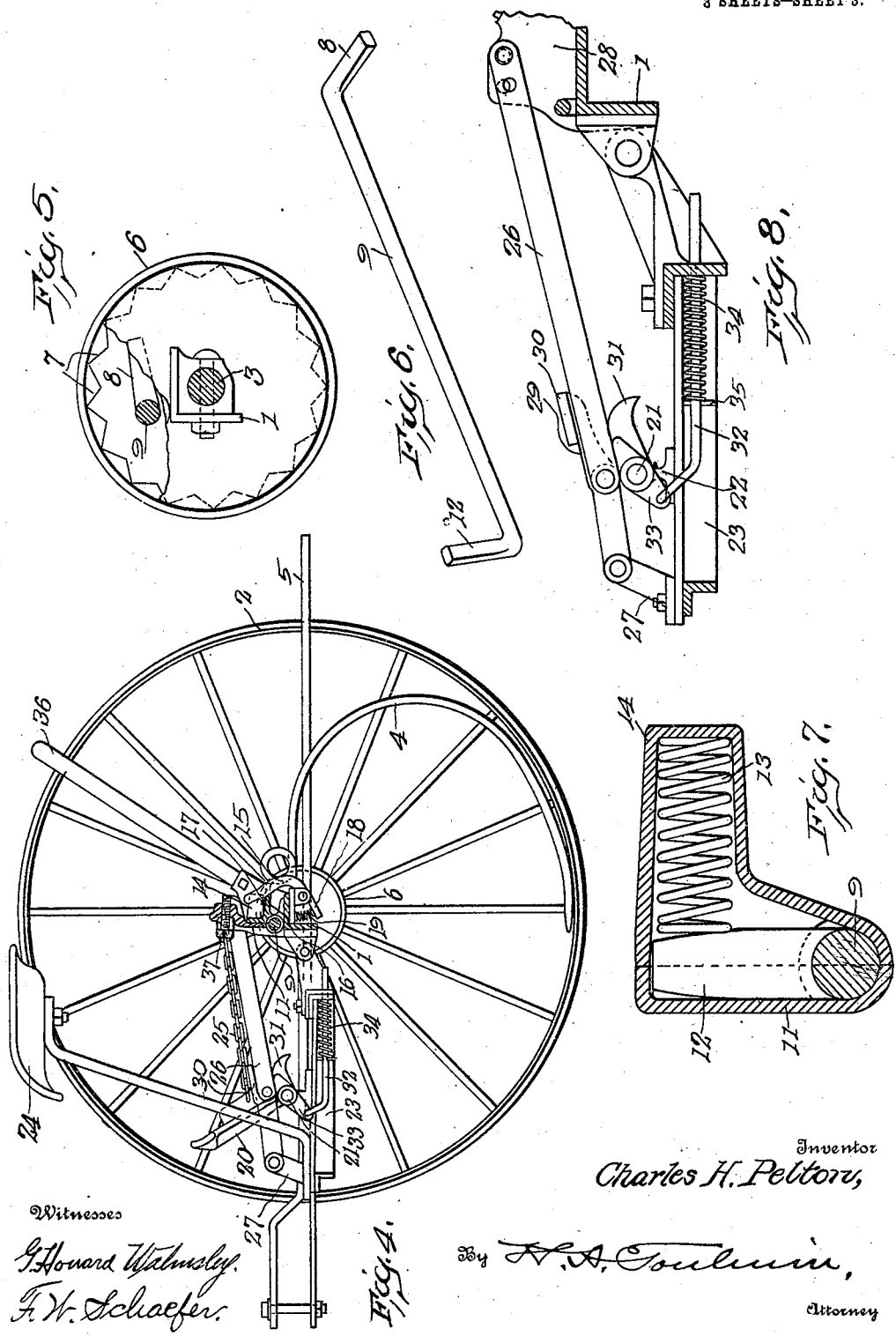

CHARLES H. PELTON, OF SPRINGFIELD, OHIO, ASSIGNOR TO THE THOMAS MANUFACTURING COMPANY, OF SPRINGFIELD, OHIO, A CORPORATION OF OHIO.

HAY-RAKE.

983,642. Specification of Letters Patent. Patented Feb. 7, 1911.

Application filed April 8, 1910. Serial No. 554,085.

*To all whom it may concern:*

Be it known that I, CHARLES H. PELTON, a citizen of the United States, residing at Springfield, in the county of Clark and State of Ohio, have invented certain new and useful Improvements in Hay-Rakes, of which the following is a specification, reference being had therein to the accompanying drawings.

This invention relates to hay rakes, and more particularly to that type of hay rake known as the self-dumping rake. In rakes of this kind the ground wheels and tooth-supporting member are usually provided with coöperating dumping devices which are moved into operative relation to cause the tooth-supporting member to be actuated by the movement of the ground wheels to elevate the rake teeth and cause the same to dump the hay which has been gathered thereby.

The object of the present invention is to provide such a rake with means for locking the coöperating dumping devices in their inoperative positions; to provide means for releasing the coöperating devices from the locking means and moving the same into their operative position; to provide means for locking said coöperating devices in their operative position during the dumping operation of the rake; to provide means for locking the teeth in their raking position during the raking operation; and to provide means for simultaneously releasing the locking means for retaining said teeth in their raking positions and moving said coöperating dumping devices into their operative positions.

In the accompanying drawings, Figure 1 is a top, plan view of a hay rake embodying my invention; Fig. 2 is a longitudinal, sectional view, taken through such a rake, showing the rake teeth in their dumping positions; Fig. 3 is a detail view showing the coöperating dumping devices locked in operative relation; Fig. 4 is a view similar to Fig. 2, showing the teeth in their raking position; Fig. 5 is a detail view of the pawl and ratchet dumping mechanism; Fig. 6 is a detail view of the pawl and its actuating rod; Fig. 7 is a sectional, detail view of the bracket and housing for actuating the pawl and its rod; and Fig. 8 is a detail view of a locking device for retaining the teeth in their raking positions and of the means for releasing said locking device.

In these drawings I have illustrated one embodiment of my invention and have shown the same as applied to a hay rake comprising a tooth-supporting member 1 which is supported at its opposite ends by ground wheels 2. In the present instance this supporting member comprises an angle iron extending transversely to the direction of movement of the rake and the ground wheels 2 are mounted on short axles 3 rigidly secured to the angle iron. The rake teeth, which are indicated at 4, are rigidly secured to the tooth-supporting member 1 and extend rearwardly and downwardly therefrom in the usual manner. The tooth-supporting member being rotatable about the axes of the axles 3 and the teeth 4 being rigidly secured thereto it will be apparent that by moving the tooth-supporting member about its longitudinal axis the teeth 4 can be moved into an elevated position, as indicated in Fig. 2, to dump the hay which has been gathered thereby. This dumping operation is facilitated by means of substantially horizontal bars 5 rigidly secured to a fixed part of the rake and extending rearwardly between the teeth. These bars prevent the hay from being carried upward with the teeth 4 and are so arranged that when the teeth are in their uppermost positions the ends of the teeth will be above the bars. Consequently, the hay will be completely dumped and none of it will adhere to the teeth. Suitable means are provided for so moving the tooth-supporting member about its longitudinal axis to dump the hay. This means usually comprises coöperating devices carried by the ground wheels and the adjacent ends of the tooth-supporting member, respectively. In the present instance these coöperating dumping devices are shown as comprising pawl and ratchet mechanisms. Each ground wheel 2 has an inwardly extending flange 6 which is provided on its inner surface with teeth 7 and constitutes the ratchet wheel. Mounted near each end of the tooth-supporting member is a pawl 8 adapted to be moved into and out of operative relation with the teeth 7 of the ratchet wheels. These pawls are mounted on the tooth-supporting member and have their pivotal centers slightly removed from the axis of rotation of said tooth-supporting member. Consequently, when the ends of the pawls are engaged by the teeth of the ratchets the pawls and the tooth-supporting member will be moved about the longitudinal axis of said tooth-supporting member and the rake teeth elevated. In the present instance each of the pawls 8 is shown as rigidly secured to and extending at substantially right angles to a rod 9 which is rotatably mounted in bearings 10 mounted upon the tooth-supporting member 1. The rod 9 of each pawl 8 terminates near the center of the tooth-supporting member and is secured to an actuating arm or bracket 11 by means of which it is rotated about its axis to move its pawl into and out of operative relation with the ratchet wheel. In the form of the device shown, each rod 9 has a finger 12 rigidly secured to and extending at an angle from the inner end thereof and the bracket 11 is in the form of a housing within which the fingers 12 are mounted and within which they are capable of a limited movement. The fingers 12 are, however, held normally against the front wall of the housing or bracket by means of springs 13 mounted in extensions 14 carried by the housing, and are thus caused to move with the bracket or housing when the latter is moved in either direction. Should either ratchet be moved rearwardly, however, owing to the turning of the rake or from any other cause, the spring will permit the pawl to ride over the teeth.

The bracket 11 is normally retained in such a position as to hold the pawls 8 in inoperative relation to the respective ratchet wheels. This I prefer to accomplish by means of a dog or lever 15 pivotally mounted on the tooth-supporting member 1 and adapted to engage a rearwardly extending projection or lip 16 carried by the bracket 11. In the construction here shown the dog 15 has a nose 17 arranged to extend above and to engage the lip 16 when the bracket is in a substantially vertical position, in which position the pawls are inoperative. The dog 15 also has a part 18 extending beyond its pivotal center and engaged by a spring 19 which tends to move the dog about its pivotal center and hold the nose 17 thereof in engagement with the lip 16 of the bracket. Consequently, the bracket and the pawls which are connected thereto will be held in their inoperative positions until positive force is applied to the bracket to overcome the pressure of the spring 19 and release the bracket from the dog. Any suitable means may be provided for moving the bracket about its pivotal center to release the same from the dog 15 and to move the pawls into their operative positions. As here shown, this means comprises a foot lever 20 rigidly secured to a shaft 21 journaled in bearings 22 carried by a frame 23, which frame is pivotally connected at its rear edge to the tooth-supporting member 1 and has mounted thereon the driver's seat 24. The lever 20 is arranged in such a position as to be readily engaged by the foot of the driver when he is on the seat 24 and is connected by means of a chain 25 with the upper end of the bracket 11. Thus, the forward pressure on the lever 20 will cause the lip 16 of the bracket to ride over the bevel nose of the dog 15 and thus release the bracket from the dog, and the further movement of the lever will move the pawls 8 into a position to be engaged by the teeth 7 of the ratchets mounted on the ground wheels. Such engagement of the pawls by the ratchets will actuate the tooth-supporting member, as above described.

Means are also provided for retaining the pawls in their operative positions relative to the teeth of the ratchet and, in the present instance, the nose 17 of the dog 15 is arranged to engage beneath the lip 16 as soon as the bracket has been moved into a position to carry the pawls into their operative relations to the ratchets, as shown in Fig. 3. This engagement of the dog with the lip of the bracket positively locks the pawls in their operative relations to the ratchets until positive force is again applied to the bracket to release the lip from the dog. This is accomplished when the end of the bracket 11 is brought into engagement with the frame 23 by the continued movement of the tooth-supporting member 1. This contact causes the bracket to be moved about its pivotal connection to the tooth-supporting member and again forces the lip 16 to ride over the nose 17 of the dog, thus releasing the bracket from the dog and permitting the pawls to be thrown out of their operative relation with the ratchet wheels. As soon as the pawls are released from the ratchets the rake teeth will drop of their own weight, restoring the tooth-supporting member 1 to its normal position. As soon as the pawls have been moved into their inoperative positions the nose 17 of the dog 15 will again engage the upper edge of the lip 16 and thus hold the pawls in their inoperative positions. The bracket 11 may, if desired, be provided with an adjustable stop, as indicated at 37, arranged to engage the frame 23 and capable of being adjusted to regulate the time at which the pawls may be released.

Means are also provided for locking the rake teeth in their raking positions, and, to this end, I have provided a toggle joint 26, the two members of which are pivotally connected one to the other at their inner ends and are pivotally connected at their opposite ends to a fixed support 27 on the frame 23 and a bracket 28 on the tooth-supporting member 1, respectively. When these members are in their extended position and the point of pivotal connection of the two members one to the other is in alinement with or below the points of pivotal connection of said members to the frame 23 and the tooth-supporting member, respectively, the tooth-supporting member will be locked against movement relative to the frame 23, and, consequently, the rake teeth will be locked in their raking positions. One of the members of the toggle joint 26 has an extension 29 to which is secured a foot piece 30, by means of which the driver can retain the toggle joint in its extended position and prevent the joint from being broken by the jar incident to the operation of the rake.

In order that the tooth-supporting member 1 may be released and free to rotate about its longitudinal axis before the pawls 8 are moved into operative relation with their ratchet wheels I have provided means for releasing the locking devices for the tooth-supporting member at the same time the pawls are moved into their operative positions. To this end I have mounted on the shaft 21 a finger or cam 31 which is arranged immediately beneath the point of connection of the two members of the toggle joint and is adapted to engage the same and move this point of connection upward when the shaft is rotated. This finger or cam 31 is retained normally in its inoperative position by means of a rod 32 pivotally connected at its forward end to a crank arm 33 which is rigidly secured to the shaft 21 and extending rearwardly through one of the members of the frame 23. A spring 34 is coiled about the rod 32 and confined between the frame member and the stop 35 on said rod and tends to maintain the shaft 21 in such a position that the finger or cam 31 will be supported normally out of engagement with the toggle joint. When the foot lever 20 is actuated to move the bracket 11 about its pivotal center and throw the pawls into their operative positions the cam 31 will also be actuated to break the toggle joint 26 and release the tooth-supporting member. A hand lever 36 is provided for moving the tooth-supporting member about its axis 2 to elevate the teeth, but this is for use in case of emergency only and has no use in the normal operation of the rake.

The operation of the device will be readily understood from the foregoing description and it will be apparent that during the raking operation the pawls 8 will be positively retained in their inoperative positions, thus effectually preventing any accidental connection between these parts, and, as soon as the pawls have been moved into their operative relation with the ratchet wheels they will be locked in that position and retained in their operative relations with said ratchet wheels regardless of whether the ground wheels continue their forward movement or come to a standstill. This locking device is released when the rake teeth have reached their dumping positions and automatically return the rake teeth to their normal or raking positions. It will be further apparent that the parts are locked in these normal positions by means of the toggle joint and that this joint is arranged to be broken simultaneously with or immediately preceding the movement of the pawls into their operative positions.

I wish it to be understood that I do not desire to be limited to the details of construction shown and described, for obvious modifications will occur to a person skilled in the art. For example, the actuating arm or bracket 11 may be of any suitable character, the bracket here shown being chosen for the purpose of illustration only.

Having thus fully described my invention, what I claim as new and desire to secure by Letters Patent, is:—

1. In a rake, the combination, with ground wheels, a tooth-supporting member carried by said wheels and movable about an axis extending transversely to the line of travel of said rake, teeth carried by said tooth-supporting member and coöperating devices carried by said tooth-supporting member and said ground wheels, respectively, to move said tooth-supporting member about said axis, of a rod arranged longitudinally to said tooth-supporting member and operatively connected with said devices carried thereby, an actuating arm for said rod, and a dog carried by said tooth-supporting member and adapted to engage said arm to retain said devices in one of their positions.

2. In a rake, the combination, with ground wheels, a tooth-supporting member carried by said wheels and movable about an axis extending transversely to the line of travel of said rake, teeth carried by said tooth-supporting member and coöperating devices carried by said tooth-supporting member and said ground wheels, respectively, to move said tooth-supporting member about said axis, of a rod arranged longitudinally to said tooth-supporting member and operatively connected with said devices carried thereby, an actuating arm for said rod having a part constituting a locking member, and a dog carried by said tooth-supporting member and arranged to engage either side of said locking member to lock said devices in either operative or their inoperative relation one to the other.

3. In a rake of the character described, the combination, with ground wheels, a tooth-supporting member carried by said ground wheels and movable about an axis extending transversely to the line of travel of said rake, rake teeth carried by said member, ratchet wheels mounted on said ground wheels, pawls mounted on said tooth-supporting member and arranged to engage the respective ratchet wheels, a rod rigidly connected to each of said pawls and arranged substantially parallel with said tooth-supporting member, and a bracket secured to the inner ends of said rods to move said pawls into and out of their operative relations with the respective ratchet wheels, of a dog carried by said tooth-supporting member and adapted to engage said bracket to retain said pawls in their operative positions.

4. In a rake of the character described, the combination, with a tooth-supporting member movable about an axis extending transversely to the line of travel of said rake, rake teeth carried thereby, a ground wheel therefor, a ratchet wheel carried by said ground wheel, a pawl, a rod rigidly secured to said pawl and rotatably mounted on said tooth-supporting member, and a bracket rigidly secured to said rod for moving said pawl into and out of operative relation with said ratchet wheel, of a locking device mounted on said tooth-supporting member and adapted to engage said bracket to lock said pawl in its operative position.

5. In a rake of the character described, the combination, with a tooth-supporting member movable about an axis extending transversely to the line of travel of said rake, rake teeth carried thereby, a ground wheel therefor, a ratchet wheel carried by said ground wheel, a pawl, a rod rigidly secured to said pawl and rotatably mounted on said tooth-supporting member, and a bracket rigidly secured to said rod for moving said pawl into and out of operative relation with said ratchet wheel, of a locking device carried by said tooth-supporting member and adapted to engage said bracket to lock said pawl in either its operative or inoperative position.

6. In a rake of the character described, the combination, with a tooth-supporting member movable about an axis extending transversely to the line of travel of said rake, rake teeth carried thereby, a ground wheel therefor, a ratchet wheel carried by said ground wheel, a pawl, a rod rigidly secured to said pawl and rotatably mounted on said tooth-supporting member, and a bracket rigidly secured to said rod for moving said pawl into and out of operative relation with said ratchet wheel, said bracket having a rearwardly extending lip, of a dog mounted on said tooth-supporting member adapted to engage beneath said lip to retain said pawl in its operative position.

7. In a rake of the character described, the combination, with a tooth-supporting member movable about an axis extending transversely to the line of travel of said rake, rake teeth carried thereby, a ground wheel therefor, a ratchet wheel carried by said ground wheel, a pawl, a rod rigidly secured to said pawl and rotatably mounted on said tooth-supporting member, and a bracket rigidly secured to said rod for moving said pawl into and out of operative relation with said ratchet wheel, said bracket having a rearwardly extending lip, of a spring-pressed dog having a nose adapted to engage either the upper or lower edge of said lip to retain said pawl in its inoperative or its operative position.

8. In a rake of the character described, the combination, with a tooth-supporting member movable about an axis extending transversely to the line of travel of said rake, rake teeth carried thereby, a ground wheel therefor, a ratchet wheel carried by said ground wheel, a pawl, a rod rigidly secured to said pawl and rotatably mounted on said tooth-supporting member, and a bracket rigidly secured to said rod for moving said pawl into and out of operative relation with said ratchet wheel, said bracket having a rearwardly extending lip, of a locking device carried by said tooth-supporting member and adapted to engage said lip to lock said pawl in either its operative or its inoperative position, means under the control of the operator for releasing said lip from said locking device and moving said pawl into its operative position, and means for automatically releasing said lip from said locking device and moving said pawl into its inoperative position.

9. In a rake of the character described, the combination, with a tooth-supporting member movable about an axis extending transversely to the line of travel of said rake, rake teeth carried thereby, a ground wheel therefor, a ratchet wheel carried by said ground wheel, a pawl, a rod rigidly secured to said pawl and rotatably mounted on said tooth-supporting member, and a bracket rigidly secured to said rod for moving said pawl into and out of operative relation with said ratchet wheel, said bracket having a rearwardly extending lip, of a dog pivotally mounted on said tooth-supporting member and having a bevel nose adapted to engage either the upper or lower edge of said lip and also having a projection extending beyond the point of pivotal connection to said supporting member, a spring tending to move said dog toward said lip, and means for moving said bracket to cause said lip to ride over said bevel nose against the tension of said spring.

10. In a rake of the character described, the combination, with a tooth-supporting member movable about an axis extending transversely to the line of travel of said rake, rake teeth carried by said member, a ground wheel supporting one end of said tooth-supporting member, coöperating devices carried by said tooth-supporting member and said ground wheel for moving said member about said axis, and means for locking said coöperating devices in inoperative relation one to the other, of means for locking said tooth-supporting member against movement about said axis.

11. In a rake of the character described, the combination, with a tooth-supporting member movable about an axis extending transversely to the line of travel of said rake, rake teeth carried by said member, a ground wheel supporting one end of said tooth-supporting member, coöperating devices carried by said tooth-supporting member and said ground wheel for moving said member about said axis, and means for locking said coöperating devices in inoperative relation one to the other, of means for locking said tooth-supporting member against movement about said axis, and means for simultaneously releasing said coöperating devices to permit them to be moved into their operative relation and releasing said tooth-supporting member to permit it to move about said axis.

12. In a rake of the character described, the combination, with a tooth-supporting member rotatable about an axis extending transversely to the line of travel of said rake, and rake teeth supported thereby, of ground wheels supporting said tooth-supporting member, ratchets carried by said ground wheels, pawls pivotally mounted on said tooth-supporting member, a bracket also pivotally mounted on said tooth-supporting member and operatively connected to said pawls, and a dog adapted to engage said bracket to lock said pawls in their inoperative positions, of a toggle joint connected at one end to said supporting member and at the other to a fixed part of said rake and adapted to lock said tooth-supporting member against movement about said axis, and means for simultaneously breaking said toggle joint and releasing said bracket from said dog.

In testimony whereof, I affix my signature in presence of two witnesses.

CHARLES H. PELTON.

Witnesses:
    J. FRED ANDERSON,
    EDWARD L. REED.